US005381184A

United States Patent [19]
Gehrmann

[11] Patent Number: 5,381,184
[45] Date of Patent: Jan. 10, 1995

[54] METHOD OF AND ARRANGEMENT FOR INSERTING A BACKGROUND SIGNAL INTO PARTS OF A FOREGROUND SIGNAL FIXED BY A PREDETERMINED KEY COLOR

[75] Inventor: Rainer Gehrmann, Alsbach-Hähnlein, Germany

[73] Assignee: U.S. Philips Corporation, New York, N.Y.

[21] Appl. No.: 986,329

[22] Filed: Dec. 7, 1992

[30] Foreign Application Priority Data

Dec. 30, 1991 [DE] Germany ............... 4143180

[51] Int. Cl.⁶ .................................. H04N 9/74
[52] U.S. Cl. ..................... 348/586; 348/591; 348/595
[58] Field of Search ............ 348/586, 587, 595, 591, 348/592; 358/22 CK, 22 PIP; H04N 9/74, 9/75

[56] References Cited

U.S. PATENT DOCUMENTS

| 4,409,611 | 10/1983 | Vlahos | 358/22 |
| 4,667,221 | 5/1987 | Cawley | 348/587 |
| 4,811,084 | 3/1989 | Belmares-Sarabia | 348/586 |
| 4,949,165 | 8/1990 | Reimann | 348/587 |
| 5,249,039 | 9/1993 | Chaplin | 348/587 |
| 5,301,016 | 4/1994 | Gehrmann | 348/586 |

FOREIGN PATENT DOCUMENTS 4017878 12/1991 Germany .
9105443 4/1991 WIPO .

Primary Examiner—James J. Groody
Assistant Examiner—Sherrie Hsia
Attorney, Agent, or Firm—Edward W. Goodman

[57] ABSTRACT

In a method of and an arrangement for inserting a background signal into parts of a foreground signal fixed by a predetermined key color, in which a control signal is derived from the foreground signal, this control signal assuming a first value when the foreground signal represents a color in the region of the key color and a second value when the foreground signal represents a different color, and in which the control signal has a transition range between the two values, a difference, influenced by the control signal, between the vector of the background signal and the vector of a signal representing the key color is vectorially added to the foreground signal.

7 Claims, 4 Drawing Sheets

METHOD OF AND ARRANGEMENT FOR INSERTING A BACKGROUND SIGNAL INTO PARTS OF A FOREGROUND SIGNAL FIXED BY A PREDETERMINED KEY COLOR

BACKGROUND OF THE INVENTION

1. Field of the Invention

The invention relates to a method for inserting a background signal into parts of a foreground signal, these parts being fixed by a predetermined key color, said method including a control signal being derived from the foreground signal, said control signal assuming a first value when the foreground signal represents a color in the region of the key color and a second value when the foreground signal represents a different color, and in which the control signal has a transition range between the two values. The invention also relates to an arrangement for carrying out that method.

A method, which is often used in television for mixing different pictures or the corresponding signals is the chromakey method. In this method a foreground signal is used which partly comprises a predetermined color—generally blue—which is replaced by corresponding parts of a background signal. The foreground signal and a background signal are applied to a picture mixer which enables the two signals to be switched in dependence upon a control signal derived from the foreground signal.

2. Description of the Related Art

In known arrangements of this type, the control signal is a switching signal, while a first value of this signal is associated with the key color and a second value of this signal is associated with those colors which deviate from the key color. Since the blue wall used for performing the method does not have a constant color, which is particularly due to non-uniform illumination, the aim is to extend the key color region to a possibly large region in the color plane, but in which the colors in the foreground should not be included. However, the sudden switching between the foreground and the background gives rise to errors, even at the smallest shifts with respect to time of the switching instant. Unprogrammed switching to the blue wall is very disturbing at the edges of the foreground. Particularly in the case of fine details, color fringes occur, more specifically in the hairline of a person who is standing in front of a background.

In an improvement of the known method, which is also referred to as soft chromakey, a proportional zone is introduced between the key color region and the foreground colors, and the control signal is no longer limited to the range of "0" and "1". Then there is a soft fading between the foreground signal and the background signal. Nevertheless, light color fringes still occur, particularly when the proportional zone is not close to the colors representing the foreground.

SUMMARY OF THE INVENTION

It is an object of the present invention to further improve a method of inserting a background signal into parts of a foreground signal fixed by a predetermined key color as far as the transitions between the foreground and the background are concerned.

For this purpose, the invention provides that in a method of and an arrangement for inserting a background signal into parts of a foreground signal fixed by a predetermined key color, in which a control signal is derived from the foreground signal, which control signal assumes a first value when the foreground signal represents a color in the region of the key color, and a second value when the foreground signal represents a different color, and in which the control signal has a transition range between the two values, that a difference, influenced by the control signal, between the vector of the background signal and the vector of a signal representing the key color is vectorially added to the foreground signal.

The method according to the invention, has the advantage that substantially no color fringes, particularly no blue color fringes occur any longer. The invention is based on the recognition that in the known soft chromakey method, the color location of the foreground is initially shifted towards the key color (generally blue) when there is fading between the foreground signal and the background signal. This shift is avoided in the method according to the invention.

In the method according to the invention, transition colors towards the key color are transformed at an early instant to the corresponding color location of the background, particularly when the proportional zone reaches as far as the center of the foreground colors. The new transition colors then do not tend towards blue. Instead, the peripheral regions of the foreground acquire the correct color fringes tending towards the colors of the peripheral regions of the inserted background.

The method according to the invention operates independently of rise times of the chrominance signals. Any transition of the foreground color to the key color, even though it is very slow, is converted into a correspondingly slow transition to the color of the inserted background.

The large proportional zone, i.e. the large length of the transformation characteristic, yields a substantially linear transformation of the color locations within the transition range. All color pixels in the transition range are effective for the insertion. Consequently, the method according to the invention is also suitable for smaller chrominance bandwidths, because it does not suppress any color pixels to be used for forming the control signal. If digital component signals are used in accordance with the 4:2:2 standard, there is no loss of quality compared with component signals in accordance with the 4:4:4 standard. Oversampling is not required when using chrominance signals.

Since the method according to the invention essentially prevents color fringes, it can also be used for the chrominance signals, while the luminance signals are faded in known manner.

These and other aspects of the invention will become apparent from and elucidated with reference to the embodiment described hereinafter.

DESCRIPTION OF THE PREFERRED EMBODIMENT

Identical components in the Figures have the same reference numbers.

The method according to the invention may be performed with separate special circuits suitable for the computing operations. All computing operations may alternatively be performed by means of an application specific integrated circuit (ASIC). The method may also be performed with a suitably programmed and sufficiently rapid signal processor. The block diagram of FIG. 1 therefore illustrates the method according to the invention and represents an embodiment of an arrangement for performing the method according to the invention.

Figure 1:
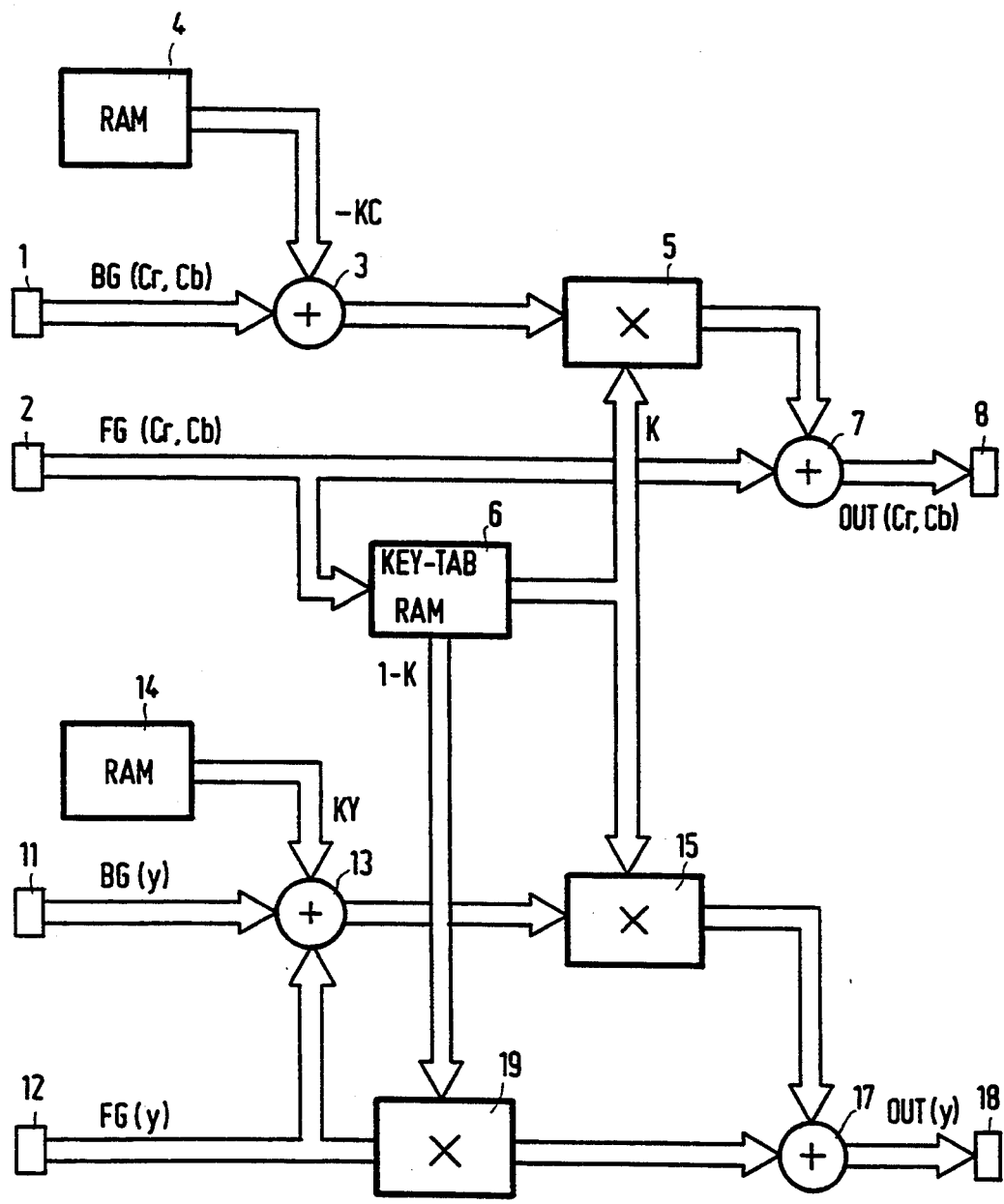
FIG. 1 is a block diagram of an arrangement for performing the method according to the invention.

FIG. 1 shows how the chrominance signals BG(Cr,Cb) and FG(Cr,Cb) are processed by means of the method according to the invention, which method will hereinafter be referred to as dynamic chroma transformation, and how the luminance signals BG(Y) and FG(Y) are processed in accordance with the known soft chromakey method.

The chrominance signals BG(Cr,Cb) representing the background are applied to the arrangement via an input 1. The chrominance signals FG(Cr,Cb) are applied to the circuit arrangement via a further input 2. The last-mentioned chrominance signals are used for a foreground and a color plane—for example, a speaker being recorded in front of a blue wall. Both signals are, for example 8-bit wide digital signals, the signals Cr,Cb being transmitted in time-division multiplex. With the aid of a first adder 3, a signal KC representing the key color and being stored in a write/read memory 4 is subtracted from the chrominance signals. The signal KC was previously set in known manner in accordance with the prevailing conditions (color of the blue wall, illumination) and written into the write/read memory 4.

The output signal of the adder 3 is applied to a multiplier 5 where it is multiplied by the control signal k. This signal is taken from a further write/read memory 6 in which the control signal k and its complement (1−k) are stored in dependence upon the foreground signal. Arrangements for deriving a control signal or a key signal are known per se and need not be further explained in connection with the present invention. A method of deriving a key signal which may be used within the scope of the invention is described, for example in Patent application DE 40 17 878. In the embodiment of FIG. 1, not all required values of the control signal k are determined again, but the previously determined values are read from a table stored in the write/read memory 6, with the foreground signals FG being used as addresses.

The result of the multiplication at 5 is added to the foreground signal FG in a second adder 7. The sum represents the output signal OUT(Cr,Cb) which comprises the foreground with the inserted background and can be derived at the output 8.

The luminance signal of the background BG(Y) and the luminance signal of the foreground FG(Y) are applied to further inputs 11 and 12. A signal KY is subtracted from the signal BG(Y) in an adder 13, the signal KY being stored in a write/read memory 14 and representing the average luminance of the blue wall. Moreover, the luminance component of the foreground may be added in the adder 13 if a shadow produced during recording of the foreground and the blue wall should also be visible on the inserted background.

The output signal of the adder 13 is applied to a multiplier 15 where it is multiplied by the control signal k which is read from the write/read memory 6. The luminance component of the foreground signal FG(Y) is multiplied by (1—k) at 19. The output signals of the multipliers 15 and 19 are then added in an adder 17 and are applied as luminance signal OUT(Y) to the output 18.

The advantages of dynamic chroma transformation as compared with the known method are explained with reference to FIGS. 2a-2e; 3a and 3b, and 4a and 4b. FIGS. 2a-2e show, in the form of time diagrams, the generation of a key signal in the color plane and the resultant video signals. When a key signal is generated in accordance with FIG. 2a, the chrominance signal Cb is supplied via a threshold so that the key signal assumes the value 1 in the shaded part of the color plane and the value K=0 in the other part. Colors outside the shaded region are considered as foreground and are present within the foreground signal, whereas colors in the shaded part are replaced by the locally corresponding components of the background signal.

Figure 2A:
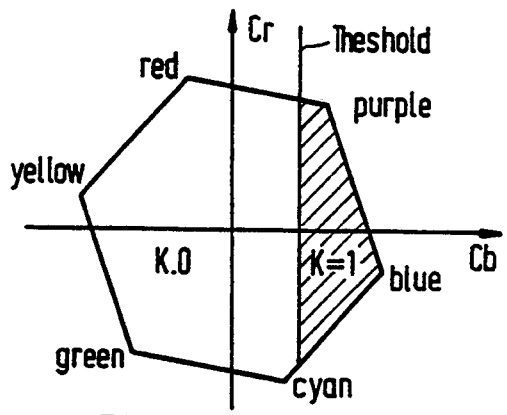
FIGS. 2a-2e show diagrams to explain the development of blue color fringes in a first known method.
Figure 2B:
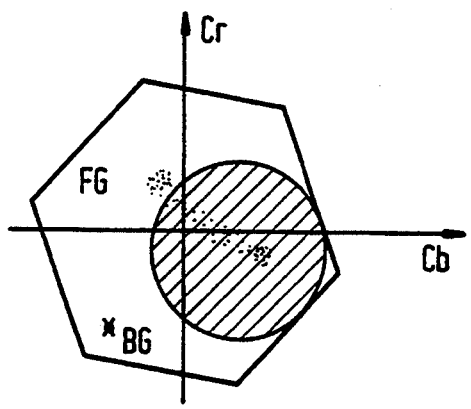
Figure 2D:
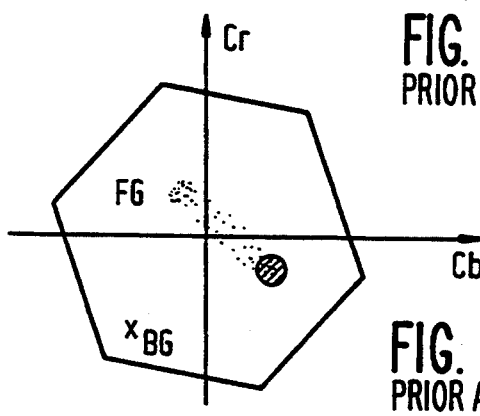

The known method can be refined in that not only the blue component but both components of the chrominance signal, viz. Cb and Cr are taken into account. This provides the possibility of defining a key region which has the form of a diamond, for example as described in the afore-mentioned Patent application DE 40 17 878. However, for further explanation, the form of a circle is assumed (FIGS. 2b and 2d). In a digital signal processing method, the desired key region may be computed once and stored as a table.

In FIGS. 2b and 2d, the colors of the foreground FG are diagrammatically represented by means of dots, with single parts of the foreground having a color between the actual key color (the centre of the circle) and the other colors of the foreground. A possible color of the background BG is shown by way of a cross.

In the example of FIG. 2b the key color region is relatively large. Those colors which individually occur at the sides of the foreground objects are also evaluated as key colors. This causes the foreground to be faded too early at the edges so that the background may shine through at some foreground locations.

Figure 2C:
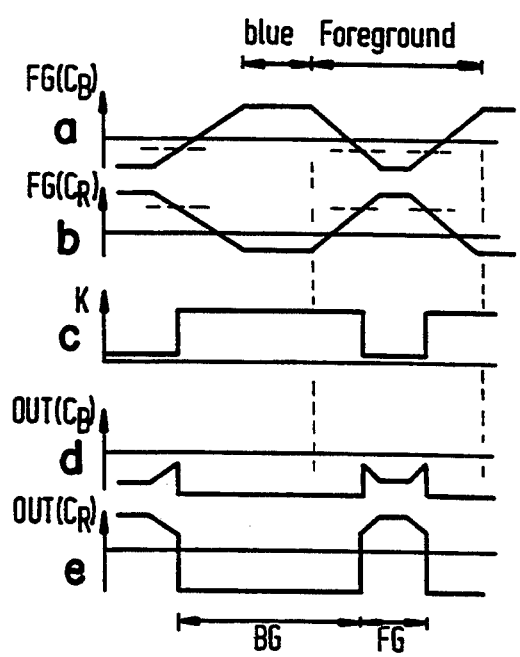
Figure 2E:
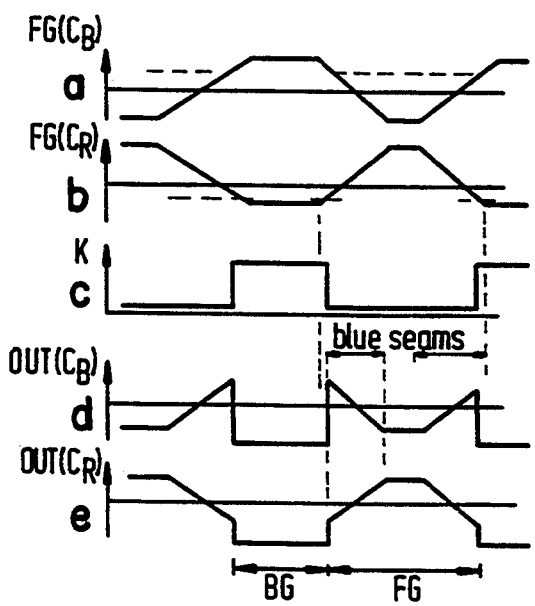

For such a large key region, the two chrominance components Cb and Cr, the key signal K as well as the chrominance components Cb and Cr of the output signal in FIG. 2c are shown in the form of time diagrams a–e, respectively. At those locations where the background signal is to be inserted, FG(Cb) is above the broken line threshold and FG(Cr) is below the threshold set for FG(Cr). It is further assumed that the signals have a finite rise time. The key signal K is formed when the components of the foreground signal FG fall below or exceed a threshold shown in a broken line in FIG. 2c. Due to the slow rise or fall of the components of the foreground signal FG as compared with the short rise and fall of the key signal K, ramp-shaped distortions are produced at the edges of the output signal OUT, these distortions being visible as blue fringes. Moreover, the part in which the output signal represents the foreground has shrunk with respect to the originally picked-up foreground signal. As a result, particularly fine details (hairs) are cut off.

In a very small key region, as is shown in FIG. 2d, this cut-off is avoided. However, stronger blue fringes result, as is clearly shown in the time diagrams a–e in FIG. 2e. In both a small and a large key region, sharp edges which have a disturbing appearance are produced between the foreground and the background due to this cut-off.

Figure 3A:
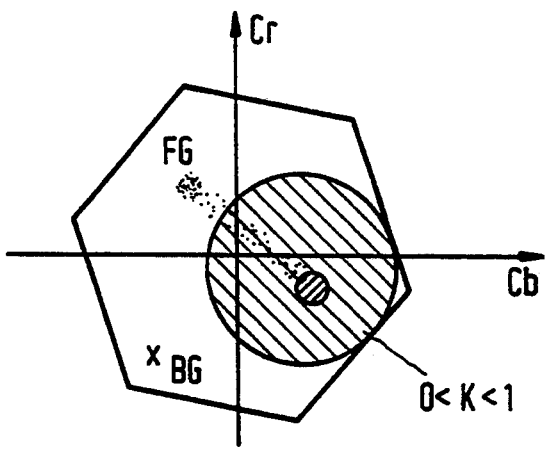
FIGS. 3a and 3b show diagrams to explain a second known method.
Figure 3B:
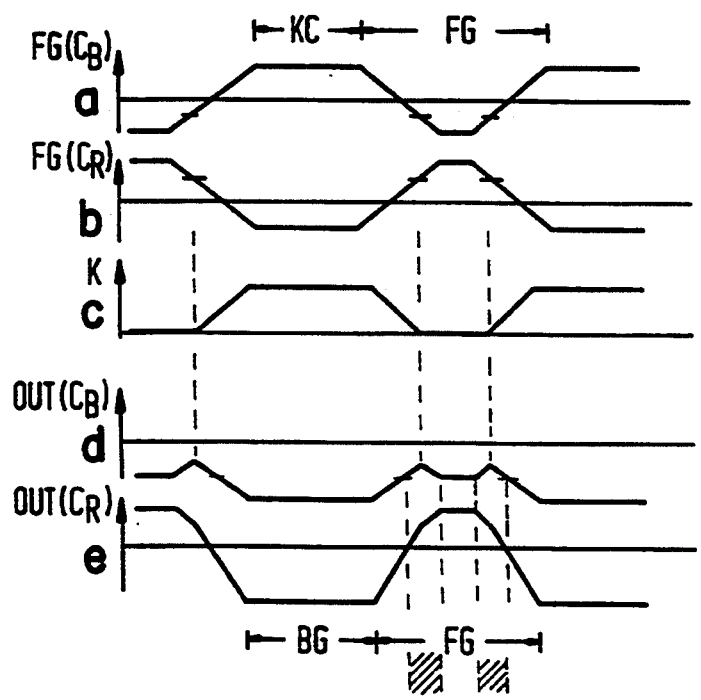

This effect is avoided in soft chromakey. FIGS. 3a and 3b show the color planes and time diagrams for the case of the soft chromakey in which the output signal is formed in accordance with the equation $OUT = k \cdot BG + (1-k) \cdot FG$. The key region comprises an inner part, in which $k=1$ and a transition or proportional zone, in which k decreases from 1 to 0. Two causes of the formation of blue fringes remain. In the first place, blue fringes are produced when the proportional zone does not extend as far as the foreground colors, as is shown in FIG. 3a. In FIG. 3b, the blue fringes are shown by way of shaded areas at the bottom of the time diagrams a–e.

Figure 4A:
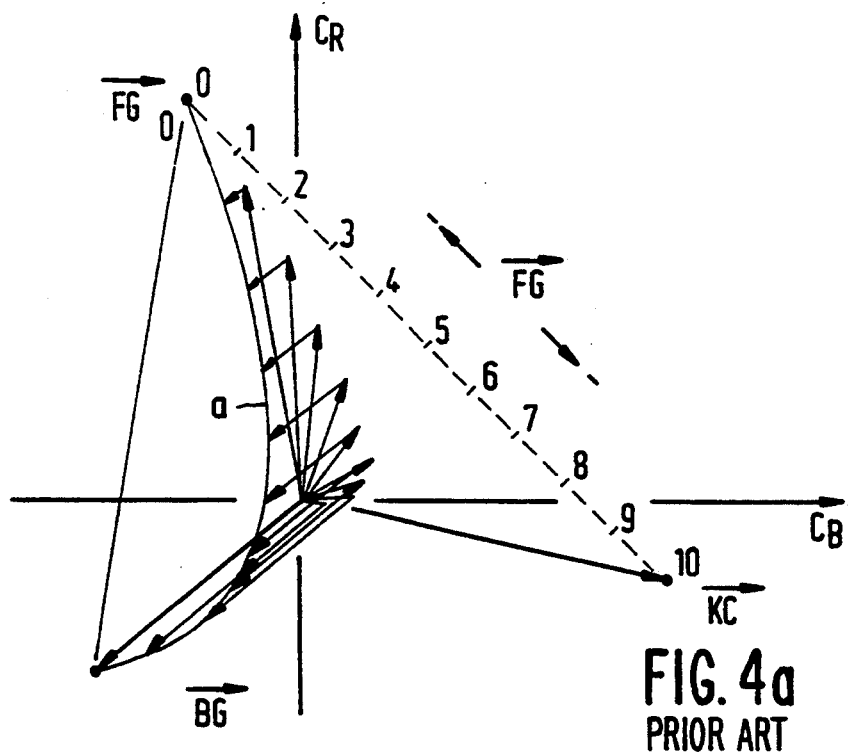
FIGS. 4a and 4b show different signals in the color plane in the second known method and in the method according to the invention.

The other cause will hereinafter be explained with reference to FIG. 4a. In this Figure, the signals FG, BG and the key color KC in the color plane are shown as vectors. The foreground signal FG may assume intermediate values between the color $FG_0$ of the actual foreground and the color KC (blue). If the transition from $FG_0$, which takes place within the signal FG via the intermediate values 1 to 9, to the key color KC in accordance with the equation $OUT = k \cdot BG + (1-k) \cdot FG$ is replaced by a transition from the foreground color $FG_0$ to the background color BG, the line a results for the intermediate values.

In the neighborhood of the foreground colors, the line a is too close to the previous course of the line towards the key color (blue). Starting from the foreground color, the first transition colors then tend towards blue again, to which the eye reacts in a very sensitive way.

Figure 4B:
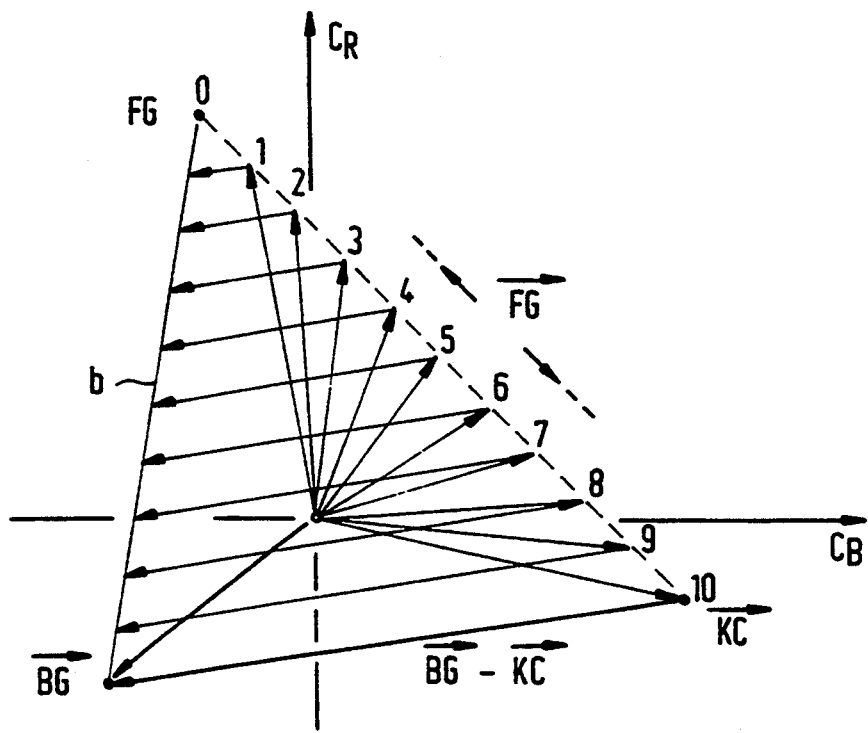

If the output signal is formed in accordance with the equation $OUT = FG + k \cdot (BG - KC)$ in the dynamic chroma transformation, the result is the line represented by b in FIG. 4b at the transition between the foreground color $FG_0$ and the background color BG. The color tending towards blue in the known method is then absent in the transition colors. If color fringes should be noticeable, they already indicate the colors of the inserted background.

I claim:

1. A method of inserting a background signal into parts of a foreground signal, said parts being fixed by a predetermined key color, said method including the step of deriving a control signal from the foreground signal, said control signal having a first value when the foreground signal represents a color in the region of the key color, and a second value when the foreground signal represents a different color, and in which the control signal has a transition range between the first and the second values, characterized in that said method further comprises the steps forming a difference, influenced by the control signal, between a vector of the background signal and a vector of a signal representing the key color, and vectorially adding said difference to the foreground signal.

2. A method as claimed in claim 1, characterized in that an output signal (OUT) with an inserted background is derived in accordance with the following equation:

$$OUT = FG + K \cdot (BG - KC)$$

in which FG is the foreground signal, K is the control signal, BG is the background signal and KC is the signal representing the key color, and FG, BG and KC have at least two components ($C_R$, $C_B$).

3. A method as claimed in claim 2, characterized in that the signals FG, BG and KC comprise components representing a blue component (Cb) and a red component (Cr), and in that a luminance component of the output signal is derived in accordance with the equation:

$$OUT = (1-K) \cdot FG + K \cdot (BG - KY).$$

4. A method as claimed in claim 1, characterized in that the transition range extends as far as the center of the colors represented by the foreground signal.

5. A method as claimed in claim 2, characterized in that the signals FG, BG and KC comprise three components each.

6. An arrangement for inserting a background signal into parts of a foreground signal, said parts being fixed by a predetermined key color, said arrangement including means for deriving a control signal from the foreground signal, said control signal having a first value when the foreground signal represents a color in the region of the key color, and a second value when the foreground signal represents a different color, and in which the control signal has a transition range between the first and the second values, characterized in that the arrangement comprises a first terminal for receiving chrominance components of the background signal and a second terminal for receiving chrominance components of the foreground signal, means for generating a signal (KC) representing the key color, a first adder having a first input coupled to the first terminal and a second input coupled to said signal generating means for adding the chrominance components of the background signal and an inverse of the signal (KC) representing the key color, a multiplier having a first input coupled to an output of the adder and a second input coupled to said means for deriving the control signal, and a second adder having a first input coupled to an output of the multiplier and a second input coupled to the second terminal carrying the chrominance components of the foreground signal, an output of the second adder carrying the output signal of the arrangement.

7. An arrangement as claimed in claim 6, wherein the background signal and the foreground signal each include a luminance component, characterized in that said arrangement further comprises a fading circuit, controlled by the control signal and a complement of the control signal, for the luminance components of the background signal and the foreground signal.

* * * * *